(12) United States Patent
Hull et al.

(10) Patent No.: US 7,506,250 B2
(45) Date of Patent: Mar. 17, 2009

(54) TECHNIQUES FOR DETERMINING ELECTRONIC DOCUMENT INFORMATION FOR PAPER DOCUMENTS

(75) Inventors: Jonathan J. Hull, San Carlos, CA (US); Jamey Graham, San Jose, CA (US); Dar-Shyang Lee, Union City, CA (US); Peter E. Hart, Menlo Park, CA (US)

(73) Assignee: Ricoh Company, Ltd., Tokyo (JP)

( * ) Notice: Subject to any disclaimer, the term of this patent is extended or adjusted under 35 U.S.C. 154(b) by 252 days.

(21) Appl. No.: 10/235,042

(22) Filed: Sep. 3, 2002

(65) Prior Publication Data

US 2004/0078749 A1    Apr. 22, 2004

(51) Int. Cl.
*G06N 3/00* (2006.01)
(52) U.S. Cl. .................................. 715/255
(58) Field of Classification Search .............. 715/500, 715/513, 517, 530, 523
See application file for complete search history.

(56) References Cited

U.S. PATENT DOCUMENTS

| | | | |
|---|---|---|---|
| 4,862,160 A | 8/1989 | Ekchian et al. | |
| 5,287,414 A | 2/1994 | Foster | |
| 5,666,490 A | 9/1997 | Gillings et al. | |
| 5,689,238 A | 11/1997 | Cannon, Jr. et al. | |
| 5,706,452 A | 1/1998 | Ivanov | |
| 5,732,401 A | 3/1998 | Conway | |
| 5,926,116 A | 7/1999 | Kitano et al. | |
| 5,933,829 A | 8/1999 | Durst et al. | |
| 5,936,527 A | 8/1999 | Isaacman et al. | |
| 5,939,981 A | 8/1999 | Renney | |
| 5,942,987 A | 8/1999 | Heinrich et al. | |
| 5,974,202 A | 10/1999 | Wang et al. | |
| 5,978,477 A | 11/1999 | Hull et al. | |
| 5,978,773 A | 11/1999 | Hudetz et al. | |
| 6,008,727 A | 12/1999 | Want et al. | |
| 6,055,544 A * | 4/2000 | DeRose et al. ............ 707/104.1 | |
| 6,100,804 A | 8/2000 | Brady et al. | |
| 6,104,834 A | 8/2000 | Hull | |
| 6,108,656 A | 8/2000 | Durst et al. | |
| 6,122,520 A | 9/2000 | Want et al. | |
| 6,127,928 A | 10/2000 | Isaacman et al. | |
| 6,130,621 A | 10/2000 | Weiss | |
| 6,176,425 B1 | 1/2001 | Harrison et al. | |
| 6,195,006 B1 | 2/2001 | Bowers | |
| 6,199,048 B1 | 3/2001 | Hudetz et al. | |
| 6,204,764 B1 | 3/2001 | Maloney | |
| 6,232,870 B1 | 5/2001 | Garber et al. | |
| 6,249,226 B1 | 6/2001 | Harrison et al. | |
| 6,259,367 B1 | 7/2001 | Klein | |
| 6,260,049 B1 | 7/2001 | Fitzgerald et al. | |
| 6,262,662 B1 | 7/2001 | Back et al. | |
| 6,278,413 B1 | 8/2001 | Hugh et al. | |
| 6,294,998 B1 | 9/2001 | Adams et al. | |
| 6,297,737 B1 | 10/2001 | Irvin | |
| 6,304,182 B1 | 10/2001 | Mori et al. | |
| 6,307,473 B1 | 10/2001 | Zampini et al. | |
| 6,324,353 B1 | 11/2001 | Laussermair et al. | |
| 6,326,889 B1 | 12/2001 | Van Horn et al. | |
| 6,333,690 B1 | 12/2001 | Nelson et al. | |
| 6,335,685 B1 | 1/2002 | Schrott et al. | |
| 6,337,619 B1 | 1/2002 | Kowalski et al. | |
| 6,340,931 B1 | 1/2002 | Harrison et al. | |
| 6,341,931 B1 | 1/2002 | Bates | |
| 6,354,493 B1 | 3/2002 | Mon | |
| 6,359,628 B1 | 3/2002 | Buytaert | |
| 6,380,894 B1 | 4/2002 | Boyd et al. | |
| 6,427,032 B1 | 7/2002 | Irons et al. | |
| 6,430,554 B1 | 8/2002 | Rothschild | |
| 6,434,561 B1 | 8/2002 | Durst, Jr. et al. | |
| 6,442,563 B1 | 8/2002 | Bacon et al. | |
| 6,512,919 B2 | 1/2003 | Ogasawara | |

(Continued)

FOREIGN PATENT DOCUMENTS

CA    2354464    7/2003

(Continued)

OTHER PUBLICATIONS

W3C, "URIs, URLs, and URNs: Clarifications and Recommendations 1.0," Sep. 21, 2001, <http://www.w3.org/TR/uri-clarification/>, pp. 1-11.*

(Continued)

*Primary Examiner*—Stephen S Hong
*Assistant Examiner*—Kyle R Stork
(74) *Attorney, Agent, or Firm*—Townsend and Townsend and Crew, LLP

(57) ABSTRACT

Techniques for determining electronic document information for a paper document. The electronic document information determined for a paper document may include information identifying an electronic document corresponding to the paper document. The electronic document information may also include information identifying a location where the electronic document is stored or a pointer or reference to the electronic document. The electronic document information determined for a paper document may be stored along with identification code information read from an identification tag that is physically associated with the paper document. The electronic document information for a paper document may also be stored in an identification tag that is physically associated with the paper document or physically associated with another paper document generated based upon the paper document.

47 Claims, 8 Drawing Sheets

U.S. PATENT DOCUMENTS

| | | | |
|---|---|---|---|
| 6,539,281 | B2 | 3/2003 | Wan et al. |
| 6,542,933 | B1 | 4/2003 | Durst, Jr. et al. |
| 6,651,053 | B1 | 11/2003 | Rothschild |
| 6,651,063 | B1 * | 11/2003 | Vorobiev ................ 707/10 |
| 6,655,586 | B1 | 12/2003 | Back et al. |
| 6,675,165 | B1 | 1/2004 | Rothschild |
| 6,707,381 | B1 | 3/2004 | Maloney |
| 6,766,363 | B1 | 7/2004 | Rothschild |
| 6,801,907 | B1 | 10/2004 | Zagami |
| 6,825,753 | B2 | 11/2004 | Cardinale et al. |
| 6,860,422 | B2 | 3/2005 | Hull et al. |
| 6,865,608 | B2 | 3/2005 | Hunter |
| 6,892,376 | B2 | 5/2005 | McDonald et al. |
| 6,993,573 | B2 | 1/2006 | Hunter |
| 7,006,664 | B2 | 2/2006 | Paraskevakos |
| 7,129,840 | B2 | 10/2006 | Hull et al. |
| 7,357,300 | B2 | 4/2008 | Hull et al. |
| 7,424,974 | B2 | 9/2008 | Hull et al. |
| 2002/0032698 | A1 | 3/2002 | Cox |
| 2002/0032707 | A1 * | 3/2002 | Takeoka ................ 707/530 |
| 2002/0113707 | A1 | 8/2002 | Grunes et al. |
| 2002/0147649 | A1 | 10/2002 | White |
| 2002/0176116 | A1 | 11/2002 | Rhoads et al. |
| 2003/0018669 | A1 * | 1/2003 | Kraft ................ 707/530 |
| 2003/0102970 | A1 | 6/2003 | Creel et al. |
| 2003/0179908 | A1 | 9/2003 | Mahoney et al. |
| 2003/0191719 | A1 * | 10/2003 | Ginter et al. ................ 705/54 |
| 2003/0214388 | A1 | 11/2003 | Stuart et al. |
| 2004/0017313 | A1 | 1/2004 | Manachs |
| 2004/0041696 | A1 | 3/2004 | Hull et al. |
| 2004/0041707 | A1 | 3/2004 | Hull et al. |
| 2004/0044956 | A1 * | 3/2004 | Huang ................ 715/511 |
| 2004/0079796 | A1 | 4/2004 | Hull et al. |
| 2004/0181756 | A1 * | 9/2004 | Berringer et al. ............ 715/530 |
| 2004/0205455 | A1 | 10/2004 | Dathathraya |
| 2004/0257231 | A1 | 12/2004 | Grunes et al. |
| 2005/0035862 | A1 | 2/2005 | Wildman et al. |
| 2005/0105724 | A1 | 5/2005 | Hull et al. |
| 2005/0182757 | A1 | 8/2005 | Hull et al. |

FOREIGN PATENT DOCUMENTS

| | | | |
|---|---|---|---|
| DE | 19646153 | A1 | 5/1998 |
| EP | 794 507 | B1 | 4/2004 |
| FR | 2782703 | A1 | 3/2000 |
| JP | 08-050598 | A | 2/1996 |
| JP | 08-1019880 | | 4/1996 |
| JP | 10-013642 | A | 1/1998 |
| JP | 10-154229 | A | 6/1998 |
| JP | 2002-120475 | A | 4/2002 |
| JP | 2002-522999 | | 7/2002 |
| JP | 2002337426 | | 11/2002 |
| WO | WO 00/26856 | A2 | 5/2000 |

OTHER PUBLICATIONS

"Hitachi Announces world's smallest RFID IC, the 'mu-chip,'" company press release, Hitachi Ltd. Tokyo, Japan (2001).

"Workflow Management Coalition Workflow Standard-Interoperability Wf-XML Binding," The Workflow Management Coalition Specification, May 1, 2000, Version 1.0, Copyright 1999, 2000 The Workflow Management Coalition, pp. 4-40 (2000).

Allen "Workflow: An Introduction," *Workflow Handbook*, Workflow Management Coalition, pp. 15-38 (2001).

Kwon "Tiny Bay Area Invention Could Change Security," on-line article available at http://www.kpix.com, KPIX Channel 5, San Francisco, CA 94111-1597 (2001).

Want et al. "Bridging Physical and Virtual Worlds with Electronic Tags," In Proc. ACM CHI '99 pp. 370-377 (1999).

Want et al. "Expanding the Horizons of Location-Aware Computing," IEEE Computer 34:31-34 (2001).

Want et al. "Ubiquitous Electronic Tagging," IEEE Distributed Systems Online 1:1-6 (2000).

Web pages from PaperClick.com printed from http://www.paperclip.com on Jun. 14, 2006.

Office Action in Corresponding Japanese Application 2003-310155.

* cited by examiner

TECHNIQUES FOR DETERMINING ELECTRONIC DOCUMENT INFORMATION FOR PAPER DOCUMENTS

CROSS-REFERENCES TO RELATED APPLICATIONS

This application incorporates by reference the entire contents of the following applications and patents for all purposes:

(1) U.S. patent application Ser. No. 08/754,721, filed Nov. 21, 1996 which issued as U.S. Pat. No. 5,978,477;

(2) U.S. patent application Ser. No. 10/235,035 filed concurrently with this application;

(3) U.S. patent application Ser. No. 10/235,032 filed concurrently with this application;

(4) U.S. patent application Ser. No. 10/235,028 filed concurrently with this application;

(5) U.S. patent application Ser. No. 10/235,030 filed concurrently with this application;

(6) U.S. patent application Ser. No. 10/234,414 filed concurrently with this application and which issued as U.S. Pat. No. 6,860,422; and (7) U.S. Pat. No. 6,104,834.

BACKGROUND OF THE INVENTION

The present invention relates generally to the field of document processing, and more particularly to techniques for locating electronic documents corresponding to paper documents.

Due to the widespread use of computers and other data processing systems an increasing amount of information is now being stored in digital or electronic form. For example, electronic information is stored in the form of electronic documents such as files, etc. Examples of electronic documents include documents created using application programs such as word processors, email programs, image editors, etc., scanned images of paper documents, documents stored in various formats such as PDF, Postscript, etc., and other types of documents stored in electronic form.

The vast number of electronic documents coupled with the proliferation of paper document output devices such as copiers, printers, and facsimile machines, has also greatly increased the number of paper documents that are generated using the electronic documents. These paper documents include printouts generated by printers, photocopies generated by copiers, facsimile documents generated by facsimile machines, photos, and the like.

Due to the large number of electronic documents and paper documents, it becomes very difficult to identify an electronic document corresponding to a particular paper document. The problem is particularly acute in office environments. Most office users have had the experience of spending a great amount of time trying to locate an electronic document corresponding to a particular paper document.

As a result, the ability to locate electronic documents corresponding to paper documents is of great importance, especially in an office environment.

BRIEF SUMMARY OF THE INVENTION

Embodiments of the present invention provide techniques for determining electronic document information for a paper document. The electronic document information determined for a paper document may include information identifying an electronic document corresponding to the paper document. The electronic document information may also include information identifying a location where the electronic document is stored or a pointer or reference to the electronic document. The electronic document information determined for a paper document may be stored along with identification code information read from an identification tag that is physically associated with the paper document. The electronic document information for a paper document may also be stored in an identification tag that is physically associated with the paper document or physically associated with another paper document generated based upon the paper document.

According to an embodiment of the present invention, techniques are provided for processing a paper document. In this embodiment, a first file descriptor is determined from an electronic representation of a first paper document. A feature descriptor is determined from a first database that matches the first feature descriptor, the first database storing information identifying a plurality of feature descriptors and electronic document information for each feature descriptor in the plurality of feature descriptors, wherein the electronic document information for a feature descriptor comprises information identifying an electronic document. Electronic document information associated with the matching feature descriptor is determined from the information stored in the first database. The identification code associated with an identification tag along with the electronic document information associated with the matching feature descriptor is stored in a second database such that the electronic document information associated with the matching feature descriptor is associated with the identification code.

According to another embodiment of the present invention, techniques are provided for performing an operation using a paper document. In this embodiment, a first identification code is read from an identification tag that is physically associated with a first paper document. An identification code from a first database that matches the first identification code is then determined, the first database storing information identifying a plurality of identification codes and electronic document information for each identification code in the plurality of identification codes, the electronic document information for each identification code comprising information identifying an electronic document. Electronic document information associated with the matching identification code is then determined from the first database. The operation is then performed or initiated using the electronic document identified by the electronic document information associated with the matching identification code.

The foregoing, together with other features, embodiments, and advantages of the present invention, will become more apparent when referring to the following specification, claims, and accompanying drawings.

DETAILED DESCRIPTION OF THE INVENTION

Embodiments of the present invention provide techniques for determining electronic document information for a paper document. The electronic document information determined for a paper document may include information identifying an electronic document corresponding to the paper document. The electronic document information may also include information identifying a location where the electronic document is stored or a pointer or reference to the electronic document. According to an embodiment of the present invention, the electronic document information determined for a paper document is stored along with identification code information read from an identification tag that is physically associated with the paper document. According to another embodiment of the present invention, the electronic document information for a paper document is stored in an identification tag that is physically associated with the paper document or physically associated with another paper document generated based upon the paper document.

For purposes of this invention, the term "paper document" is intended to refer to any document comprising one or more pages of any tangible medium on which information can be printed, written, drawn, imprinted, embossed, etc. For example, a paper document may refer to a document printed by a printer, a document output by a copier or scanner, a document output by a facsimile machine, a photograph, a book, a single page of paper, a document comprising a plurality of papers, and the like.

For purposes of this invention, the term "electronic document" is intended to refer to information stored in an electronic or digital form. Examples of electronic documents include files, documents created using application programs such as word processors, email programs, image editors, etc., scanned images of paper documents, documents stored in various formats such as PDF, Postscript, etc., and other types of documents stored in electronic form.

Figure 1A:
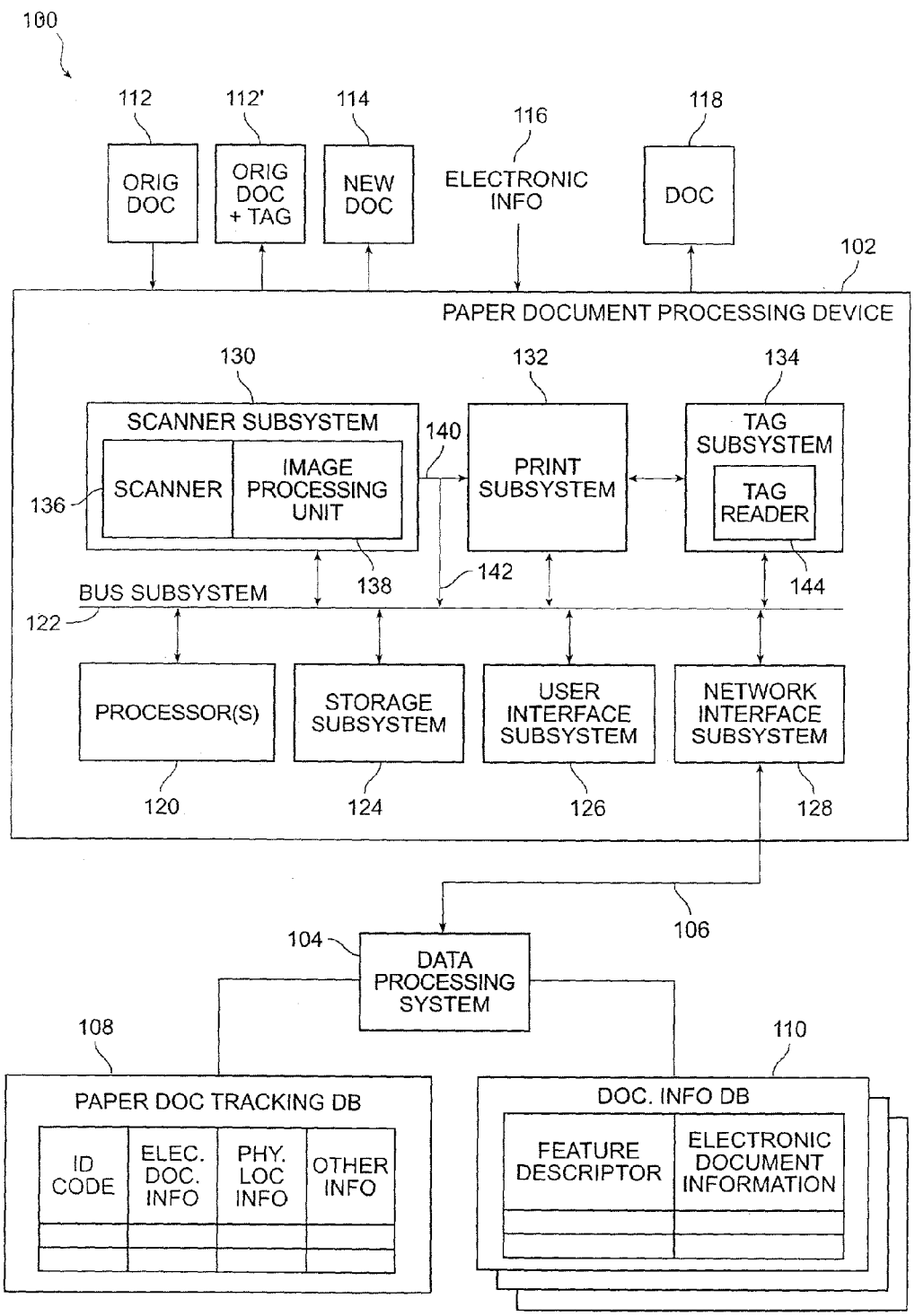
FIG. 1A is a simplified block diagram of a system that may incorporate an embodiment of the present invention.

FIG. 1A is a simplified block diagram of a system 100 that may incorporate an embodiment of the present invention. As depicted in FIG. 1A, system 100 comprises a paper document processing device 102 coupled to a data processing system 104 via communication links 106. Data processing system 104 is coupled to a paper document tracking database 108 and to one or more document information databases 110. It should be understood that the configuration depicted in FIG. 1A is merely illustrative of an embodiment incorporating the present invention and does not limit the scope of the invention as recited in the claims. One of ordinary skill in the art would recognize other variations, modifications, and alternatives.

Communication links 106 depicted in FIG. 1A may be of various types including hardwire links, optical links, satellite or other wireless communication links, wave propagation links, or any other mechanisms for communication of information. Various communication protocols may be used to facilitate communication of information via the communication links. These communication protocols may include TCP/IP, HTTP protocols, extensible markup language (XML), wireless application protocol (WAP), protocols under development by industry standard organizations, vendor-specific protocols, customized protocols, and others.

Communication links 106 may traverse one or more communication networks. These communication networks may include a LAN, a wide area network (WAN), a metropolitan area network (MAN), a wireless network, an Intranet, the Internet, a private network, a public network, a switched network, an optical network, or any other suitable communication network.

Paper document processing device 102 is configured to physically associate identification tags with paper documents. Paper document processing device 102, in cooperation with data processing system 104, also facilitates identification of electronic document information for a paper document. The electronic document information may include information identifying an electronic document corresponding to the paper document and information identifying a location where the electronic document is stored or from where the electronic document can be accessed or a pointer or reference to the electronic document. In the embodiment depicted in FIG. 1A, paper document processing device 102 provides information to data processing system 104 that is used by data processing system 104 to determine electronic document information for a paper document processed by paper document processing device 102. Paper document processing device 102 receives the electronic document information from data processing system 104 and may store the electronic document information or a portion thereof on the identification tag that is physically associated with the paper document. Paper document processing device 102 may be embodied as a printer, scanner, copier, facsimile machine, camera that are capable of printing photos, and the like.

According to an embodiment of the present invention, paper document processing device 102 is configured to receive a paper document 112 and physically associate an identification tag with document 112 to produce document 112'. For purposes of clarity, paper document 112 will be referred to as the "original paper document". Accordingly, in this embodiment, paper document 112' represents the original paper document with an identification tag physically associated with it. Original paper document 112 may be a single-page or a multi-page paper document.

In other embodiments, paper document processing device 102 may be configured to generate a new paper document 114 based upon original paper document 112 and physically associate an identification tag with new document 114. For example, if paper document processing device 102 is configured to function as a copier, paper document processing device 102 may generate a photocopy 114 for paper document 112 and physically associate an identification tag with photocopy 114.

In yet other embodiments, paper document processing device 102 may be configured to receive electronic information 116 and print the electronic information on a paper medium to generate paper document 118. In this embodiment, paper document processing device 102 is configured to physically associate an identification tag with paper document 118. For example, paper document processing device 102 may be configured to function as a printer or a facsimile machine. In a printer mode, paper document processing device 102 receives electronic information 116 and generates a printout 118 based upon the information. In a facsimile machine mode, paper document processing device 102 receives facsimile information 116 and generates a facsimile paper document 118. An identification tag is attached to the printout or facsimile paper document.

As shown in FIG. 1A, paper document processing device 102 includes a processor 120 that communicates with a number of peripheral subsystems via a bus subsystem 122. These peripheral subsystems may include a storage subsystem 124, a user interface subsystem 126, a network interface subsystem 128, a scanner subsystem 130, a print subsystem 132, and a tag subsystem 134.

Bus subsystem 122 provides a mechanism for letting the various components and subsystems of paper document processing device 102 communicate with each other as intended. Although bus subsystem 122 is shown schematically as a single bus, alternative embodiments of the bus subsystem may utilize multiple buses.

User interface subsystem 126 allows user interaction with paper document processing device 102. A user may be a human user, a device, a process, another computer, an application program, and the like. User interface subsystem 126 may be implemented using a touch pad, a touch screen, mechanical buttons, and the like. For example, when paper document processing device 102 is configured to function as a copier, interface 126 allows the user to select options for generating a photocopy 114 from original document 112. For example, interface 126 may allow the user to select the paper size to be used for generating the photocopy, the copy darkness, the copy contrast, number of copies to be produced, magnification/reduction ratio, and other like options known to those skilled in the art. Interface 126 may also provide a "Copy/Start" key that allows the user to initiate the copying function. Upon selection of the "Start/Copy" key, paper document processing device 102 prints a copy 114 (or photocopy) of original document 112.

According to an embodiment of the present invention, interface 116 allows a user to select if an identification tag is to be physically associated with documents 112', 114, or 118 generated by paper document processing device 102. For example, before photocopying an original document 112, interface 126 may prompt the user to select whether an identification tag is to be physically associated with the photocopy. An identification tag is then physically associated with the photocopy paper document only if the user indicates that an identification tag is to be physically associated with the photocopy.

In an alternative embodiment of the present invention, an identification tag may be physically associated with documents 112', 114, or 118 without prompting the user or without receiving the user's permission. For example, when functioning in a copier mode, activation of the "Copy/Start" key by the user is sufficient to initiate the photocopying function, cause paper document processing device 102 to physically associate an identification tag to the generated photocopy paper document, perform operations to determine electronic document information for the paper document, and store the electronic document information or a portion thereof on the identification tag that is physically associated with the generated paper document.

According to an embodiment of the present invention, selection of the an operation key such as "Copy/Start" key represents a single user command that is interpreted by paper document processing device 102 to request both performance of the operation (e.g., copying), physically associating an identification tag with the generated photocopy, performing operations to determine electronic document information for the paper document, and storing the electronic document information or a portion thereof on the identification tag that is physically associated with the generated paper document. In this embodiment, the user may not be aware that an identification tag has been applied to the paper document (112', 114, or 118) produced by paper document processing device 102 and that electronic document information corresponding to the paper document has been stored on the identification tag.

User interface subsystem 116 also serves as an interface for outputting information to the user. For example, information related to the status of paper document processing device 102 or information related to operations performed by paper document processing device 102 might be output to the user via interface 126.

Network interface 128 provides an interface to other computer systems, networks, and devices. As depicted in FIG. 1A, network interface subsystem 128 enables paper document processing device 102 to communicate and exchange information with data processing system 104. Embodiments of network interface subsystem 128 include an Ethernet card, a modem (telephone, satellite, cable, ISDN, etc.), (asynchronous) digital subscriber line (DSL) units, and the like. Network interface system 128 facilitates transfer of information to and from paper document processing device 102 in an appropriate format.

Processor 120 performs or controls the overall functioning of paper document processing device 102. For example, processor 120 may execute a program that controls the functions of the various subsystems of paper document processing device 102. These functions may include physically associating identification tags with documents 112', 114, or 118, facilitating identification of electronic document information for paper documents, and storing the electronic document information or a portion thereof or other information on the identification tags that are physically associated with paper documents 112', 114, or 118.

Storage subsystem 124 stores the basic programming and data constructs that provide the functionality of paper document processing device 102. For example, according to an embodiment of the present invention, software modules and control programs implementing the functionality of paper document processing device 102 may be stored in storage subsystem 124. Processor 120 may execute these software modules. Storage subsystem 124 may also provide a repository or database for storing information according to the teachings of the present invention.

Scanner subsystem 130 includes a scanner 136 and an image-processing unit 138. Scanner 136 is configured to capture an electronic representation (e.g., a scanned image) of original paper document 112. According to an embodiment of the present invention, the scanned image is transmitted to image processing unit 138 that operates to remove distortion inherent in the scanning process. The output of image-processing unit 138 is a scanned image of original paper document 112 with the distortion removed. The scanned image may then be forwarded to print subsystem 132 for further processing via video bus 140. The scanned image may be used to generate document 114.

According to an embodiment of the present invention, an image data tap 142 provides processor 120 with access to scanned image data transferred over video bus 140. In alternative embodiments of the present invention, the image scanned by scanner 136 may be provided to processor 120 by scanner subsystem 130.

According to an embodiment of the present invention, the electronic representation of original paper document 112 (e.g., the scanned image of original document 112) captured by paper document processing device 102 is communicated to data processing system 104 for further processing. Data processing system 104 uses the electronic representation of original paper document 112 received from paper document processing device 102 to determine electronic document information for the paper document. The electronic document information or a portion thereof is then communicated to paper document processing device 102 from data processing system 104.

Print subsystem 132 is used in embodiments where paper document processing device 102 is configured to generate a new paper document, for example, documents 114 or 118. For example, print subsystem 132 is used in embodiments where paper document processing device 102 is configured to operate as a copier, printer, facsimile machine, etc. Print subsystem 132 operates in accordance with well-known laser xerography principles. In a copier mode, print subsystem 132 is configured to receive scanned information from scanner subsystem 130 and produce a paper document photocopy 114 of original document 112. In a printer or facsimile machine mode, print subsystem 132 is configured to generate a paper document printout or facsimile document based on electronic information 116 or based upon scanned information from scanner subsystem 130. Print subsystem 132 operates in synchrony with tag subsystem 134 to ensure that an identification tag is appropriately physically associated with documents 112', 114, or 118.

Tag subsystem 134 is configured to physically associate identification tags with documents 112', 114, or 118 generated by paper document processing device 102. Various devices known to those skilled in the art may be used as identification tags. According to an embodiment of the present invention, each identification tag device includes an on-device memory that is capable of storing information.

According to an embodiment of the present invention, each identification tag stores information that can be used to uniquely identify the paper document with which the identification tag is physically associated. For example, an identification tag may store an identification code that may be used to uniquely identify a paper document with which the identification tag is physically associated. It should be understood that other types of information that can be used to identify documents might also be stored in an identification tag in alternative embodiments of the present invention.

Depending upon the type of identification tag used, the identification code information may be stored in the memory of the identification tag when the tag is manufactured, when the tag is activated, or at some later time using software or hardware techniques. For example, paper document processing device 102 may be configured to write a unique identification code in the memory of an identification tag that is selected to be physically associated with a paper document generated by paper document processing device 102.

According to an embodiment of the present invention, radio frequency identification devices (RFIDs) are used as identification tags. For example, the Mu-chip manufactured by Hitachi, Ltd. may be used as an identification tag. The Mu-chip is a radio recognition IC chip that measures 0.4-mm square and is 60 microns thick in its present embodiment. Due to its reduced size, the Mu-chip can be embedded in paper. The Mu-chip comprises an on-chip memory (presently a 128-bit ROM) that can be programmed to store information (e.g., an identification code, electronic document information).

According to an embodiment of the present invention, tag subsystem 134 is configured to read information (e.g., identification code) from an identification tag that is physically associated with a paper document. In order to facilitate reading of the identification code from the identification tag, one or more tag readers 144 may be incorporated into tag subsystem 134. If an identification tag is physically associated with original document 112, the tag readers of tag subsystem 134 may read the information stored from the identification tag physically associated with the original document. The tag readers are also configured to read information from identification tags that are either physically associated with or selected to be physically associated with documents 112', 114, or 118. The identification code information read by paper document processing device 102 from an identification tag is forwarded to data processing system 104 for further processing.

The type of tag reader used and the technique used by the tag reader for reading the information stored on an identification tag depends on the type of identification tags. According to an embodiment of the present invention, a tag reader may read information from an identification tag by scanning the identification tag. In other embodiments, a tag reader may read the information by receiving the information from the identification tag. A tag reader may receive the information from an identification tag in response to an external stimulus (e.g., electromagnetic energy) or signal provided to the identification tag. The external stimulus or signal may be provided by the tag reader or by some other device or application. If the identification tag is self-powered, the identification tag may be configured to communicate the information stored by the identification tag to the tag reader. A tag reader may read the information stored by a tag reader in various forms including electromagnetic waves, electronic signals, acoustic signals, etc.

For example, in its present embodiment, information stored by a Hitachi Mu-chip can be read by exposing the Mu-chip to 2.45 GHz band microwaves. The Mu-chip uses the microwave energy as a power source and communicates the information stored in the on-chip memory in the form of radio waves that can be detected and read by a tag reader. In alternative embodiments, the Mu-chip may also include an on-chip antenna to increase the communication distance range. In yet other embodiments, a power source may be provided on the Mu-chip and the Mu-chip may be programmed to communicate the information stored by the Mu-chip to a tag reader. Accordingly, if a Hitachi Mu-chip is used as an identification tag, tag reader 144 included in tag subsystem 134 may be constructed to expose the Mu-chip to 2.45 GHz band of microwaves and to detect and read radio waves emanating from the Mu-chip. Various other types of tag readers that are capable of detecting electromagnetic, optical, acoustical, or other signals may be used in alternative embodiments of the present invention using other forms of identification tags.

Paper document processing device 102 may use various different techniques to physically associate an identification tag with a paper document (document 112', 114, or 118) generated by paper document processing device 102. The identification tag may be permanently or temporarily attached to a paper document or a page of the paper document. The tag may be attached to the paper document using clips, staples, adhesives, ties, strings, rubber bands, labels with identification tags, and the like. The identification tag may be embedded in a page of the paper document. An identification tag may also be incorporated into an object such as a label, a staple, etc. that is attached to the paper document.

According to one technique, depending on the size of the identification tag, the identification tag is embedded in a page of the paper document. For example, a Mu-chip, due to its reduced size, can be embedded in a page of the paper document. A paper page that has an identification tag embedded in it may be referred to as "tagged paper". Accordingly, in an embodiment using Hitachi Mu-chips as identification tags, paper document processing device 102 may physically associate an identification tag with a paper document by using at least one tagged paper to generate the paper document. According to an embodiment of the present invention, if the paper document processing device 102 has access to tagged paper, paper document processing device 102 may use one or more of the tagged papers to generate the paper document. This technique may be used when paper document processing device 102 generates a new paper document (either paper document 114 or 118). In this embodiment, tag subsystem 134 in conjunction with print subsystem 132 ensures that at least one tagged page is used to generate paper document 114 or 118. If the generated new paper document consists of multiple pages, then normal paper pages (i.e., paper pages without the embedded identification tag) may be used for other pages of the document. The selection of one or more tagged papers for generating paper documents 114 or 118 may be performed by tag subsystem 124, by print subsystem 122, or by the two in conjunction.

An identification tag may also be physically associated with a paper document by physically applying or attaching the identification tag to the paper document. If the size of the identification tag permits, the identification tag may be attached to the paper document such that it is not directly visible to the unaided observer or user of the paper document. For example, the identification tag may be embedded or mounted on a staple, and paper document processing device 102 may attach the staple to the paper document. Such a technique may be used to generate document 112' by applying an identification tag to original document 112. Such a technique may also be used to generate documents 114 or 118.

According to an embodiment of the present invention, an identification tag may be attached to a paper document by mixing the identification tag in the ink that is printed on one or more pages of the paper document. Such a technique may be used when paper document processing device 102 generates a new document (i.e., document 114 or 118). An identification tag may also be physically associated with a paper document generated by paper document processing device 102 using an adhesive, a clip, or other like mechanism.

In alternative embodiments, paper document processing device 102 may dispense a sticker or label comprising an identification tag. The identification tag may be physically associated with a paper document (either document 112', 114, or 118) generated by paper document processing device 102 by applying the sticker or label to the paper document. For example, paper document processing device 102 may dispense a label comprising an identification tag and a user may be requested to apply the dispensed label to a paper document. For example, the label may be applied to original document 112 to generate document 112'. Various other techniques may also be used to physically associate an identification tag with a paper document.

As indicated above, according to an embodiment of the present invention, each identification tag stores identification code information that is used to uniquely identify the paper document with which the identification tag is physically associated. According to an embodiment of the present invention, paper document processing device 102 may be configured to store the identification code information in an identification tag. Paper document processing device 102 may also be configured to store electronic document information or a portion thereof in an identification tag that is physically associated with a paper document. In the embodiment depicted in FIG. 1A, paper document processing device 102 receives the electronic document information from data processing system 104. The electronic document information may include information identifying an electronic document for the paper document, information identifying a storage location of the electronic document or a pointer or reference to the electronic document.

In addition to identification code information and electronic document information, other type of information related to a paper document may also be stored in an identification tag that is physically associated with the paper document. For example, the information stored in an identification tag may include an electronic representation of the contents of the paper document (e.g., a scanned image of the paper document, a Postscript format file or Portable Document Format (PDF) or image format or other file format, etc.), information identifying the author of the paper document, the date when the paper document was created, the number of pages in the paper document, and other like information.

Other information that can be stored in an identification tag is described in U.S. application Ser. Nos. 10/235,035, 10/235,032, 10/235,028, 10/235,030, 10/234,414, the entire disclosures of which are herein incorporated by reference for all purposes. As described in U.S. application Ser. No. 10/235,035, the information stored in an identification tag may be used to track the physical location of the paper document with which the identification tag is physically associated.

The various subsystems of paper document processing device 102 function in synchrony to ensure proper functioning of paper document processing device 102. Various synchronization signals known to those skilled in the art may be used to achieve this synchronization. It should be understood that various other configurations of paper document processing device 102 are possible having more or fewer components than the system depicted in FIG. 1A.

Data processing system 104 depicted in FIG. 1A is configured to determine electronic document information for a paper document based upon information related to the paper document received from paper document processing device 102 and based upon information stored in one or more document information databases 110. Data processing system 104 may be any computer system known to those skilled in the art.

As indicated above, for a paper document processed by paper document processing device 102, data processing system 104 receives, from paper document processing device 102, identification code information used to identify the paper document and an electronic representation (e.g., a scanned image) of the paper document captured by paper document processing device 102. According to an embodiment of the present invention, data processing system 104 extracts a feature descriptor from the scanned image received from paper document processing device 102. Based upon the feature descriptor determined from the electronic representation of the paper document and based upon information stored in document information databases 110, data processing system 104 determines electronic document information for the paper document. Further details related to processing performed by data processing system 104 for determining electronic document information for a paper document are described below.

A feature descriptor extracted from an electronic representation of a paper document represents information extracted from electronic representation (e.g., a scanned image). The feature descriptor can be used to uniquely identify the document. The extracted feature descriptor can be matched to other feature descriptors if the feature descriptors are consistently extracted from a similarly located section (e.g., a small rectangular patch such as a 1 inch by 1 inch patch) of the scanned image. If feature descriptors are extracted from consistent portions of the electronic representations (e.g., a scanned image) of paper documents, then if two feature descriptors match then there is a high likelihood that the scanned images from which the feature descriptors were extracted also match. Alternatively, if two feature descriptors do not match, then there is a high likelihood that the scanned images used for extracting the feature descriptors do not match, which in turn implies that the documents corresponding to the scanned images are different. One technique used by data processing system 104 for extracting a feature descriptor from an electronic representation of a paper document is described below. Various other feature extraction techniques known to those skilled in the art may also be used by data processing system 104. For example, various feature extraction techniques described in U.S. Pat. No. 6,104,834 may also be used by the present invention. The entire contents of U.S. Pat. No. 6,104,834 are incorporated herein by reference for all purposes.

According to an embodiment of the present invention, the electronic document information determined by data processing system 104 is communicated to paper document processing device 102. Paper document processing device 102 may then store the electronic document information or a portion thereof in the identification tag that is physically associated with the paper document.

According to an embodiment of the present invention, each document information database 110 stores feature descriptors that have been previously determined for a plurality of documents. For each feature descriptor, electronic document information corresponding to the feature descriptor is also stored. As depicted in FIG. 1A, the information may be stored in the form of a table wherein each row of the table stores information related to a particular feature descriptor. As shown in FIG. 1A, each row stores information identifying a feature descriptor and electronic document information corresponding to the feature descriptor.

The electronic document information may comprise information identifying an electronic document and a storage location for the electronic document represented by the feature descriptor (or a pointer of reference to the electronic document). For example, electronic document information for a particular feature descriptor may identify a uniform resource identifier or locator (URI or URL) pointing to an electronic document corresponding to the particular feature descriptor, a file corresponding to the particular feature descriptor and a directory location where the file is stored, and other like information. According to an embodiment of the present invention, the information in a document information database 110 is indexed by the feature descriptors information. Accordingly, for a particular feature descriptor extracted by data processing system 104 for a particular paper document processed by paper document processing device 102, data processing system 104 may use the feature descriptor to search document information databases 110 to find one or more matching feature descriptors.

Data processing system 104 is also configured to store information received from paper document processing device 102 and the electronic document information determined by data processing system 104. According to an embodiment of the present invention, for each identification code for a paper document received from paper document processing device 102, data processing system 104 stores the identification code information and the corresponding electronic document information determined from the electronic representation corresponding to the paper document identified by the identification code. The electronic document information determined for a document is associated with the identification code corresponding to the document and stored in a manner such that the electronic document information for a particular paper document can be determined given the identification code for the paper document.

Other information received by data processing system 104 from paper document processing device 102 for the particular identification code may also be stored such that the other information can be retrieved given the identification code information. For example, as described in U.S. patent application Ser. No. 10/235,035, information identifying physical locations of paper documents may also be stored. Other information related to the paper document that is received by data processing system 104 from paper document processing device 102 such as an electronic representation of the paper document may also be stored and associated with a particular identification code.

According to an embodiment of the present invention, the identification code information, the electronic document information, and other information is stored in paper document tracking database 108. Paper document tracking database 108 may be indexed by the identification code information. As depicted in FIG. 1A, paper document tracking database 108 may be implemented as a table wherein each row of the table stores information related to a particular identification code. As shown in FIG. 1A, each row stores information identifying an identification code, electronic document information determined by data processing system 104 for a paper document corresponding to the identification code, physical location information for the paper document identified by the identification code, and other information related to the paper document identified by the identification code.

Figure 1B:
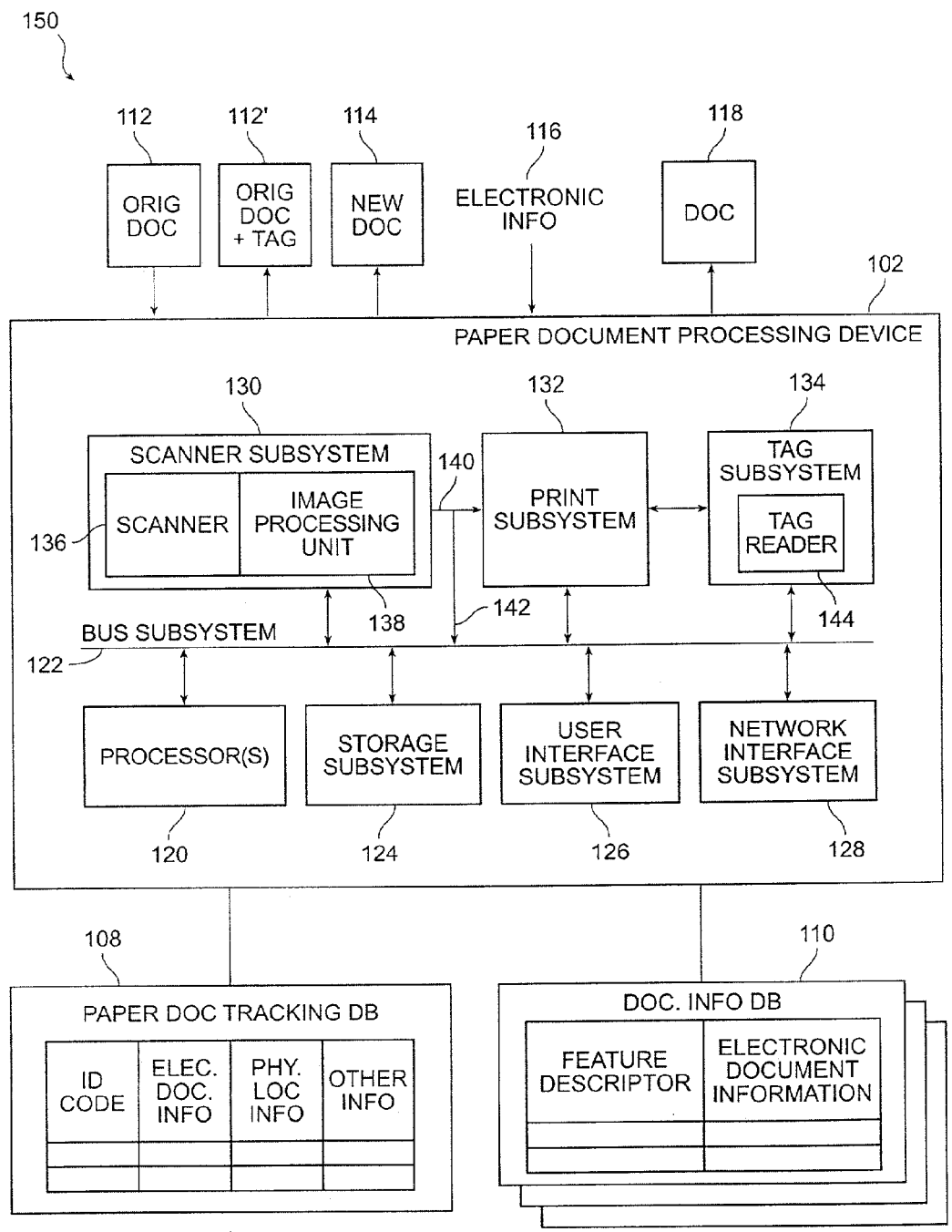
FIG. 1B is a simplified block diagram of another system that may incorporate an embodiment of the present invention.

FIG. 1B is a simplified block diagram of another system 150 that may incorporate an embodiment of the present invention. The embodiment depicted in FIG. 1B is similar to the embodiment depicted in FIG. 1A with data processing system 104 removed. In the embodiment depicted in FIG. 1B, paper document processing device 102 is configured to perform the functions that were performed by data processing system 104 depicted in FIG. 1A. It should be understood that the configuration depicted in FIG. 1B is merely illustrative of an embodiment incorporating the present invention and does not limit the scope of the invention as recited in the claims. One of ordinary skill in the art would recognize other variations, modifications, and alternatives.

Figure 2:
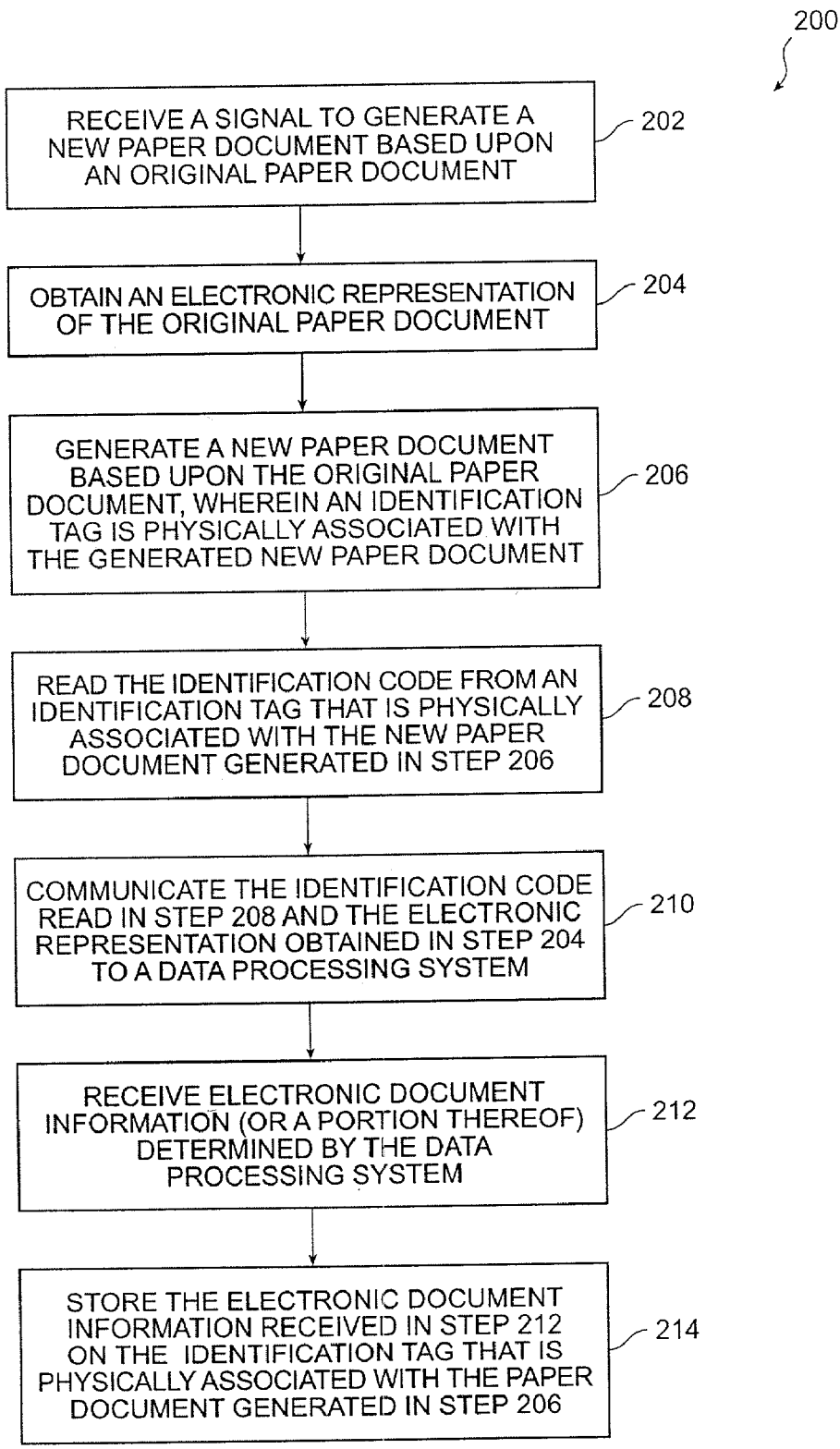
FIG. 2 is a simplified high-level flowchart depicting a method performed by a paper document processing device for generating a paper document according to an embodiment of the present invention.

FIG. 2 is a simplified high-level flowchart 200 depicting a method performed by paper document processing device 102 for generating a paper document (either document 112', 114, or 118) according to an embodiment of the present invention. The flowchart depicted in FIG. 2 assumes that a paper document processing device 102 is coupled to a data processing system 104 (similar to the embodiment shown in FIG. 1A). However, it should be understood that the general processing depicted in FIG. 2 may also be applied to other embodiments of the present invention. Further, flowchart 200 depicted in FIG. 2 assumes that a new paper document 114 is to be generated based upon original paper document 112. It should however be understood that the processing depicted in FIG. 2 may also be applied to generate documents 112' or 118. Accordingly, flowchart 200 depicted in FIG. 2 is merely illustrative of an embodiment incorporating the present invention and does not limit the scope of the invention as recited in the claims. One of ordinary skill in the art would recognize variations, modifications, and alternatives. The processing depicted in FIG. 2 may be performed by software modules executed by a processor of paper document processing device 102, by hardware modules of paper document processing device 102, or a combination thereof.

As depicted in FIG. 2, processing is initiated when paper document processing device 102 receives a signal to generate a new paper document based upon an original document 112 provided to paper document processing device 102 (step 202). The signal may be received from various sources. For example, if paper document processing device 102 is configured to function as a copier, the signal may be received when a user selects a "Copy/Start" key provided by the user interface of paper document processing device 102. The signal may also be received from various applications and devices.

Paper document processing device 102 then obtains an electronic representation of the original paper document (step 204). According to an embodiment of the present invention, paper document processing device 102 captures a scanned image of the original paper document in step 204. As described above, scanner subsystem 130 of paper document processing device 102 may be configured to capture and generate a scanned image of the original paper document.

Paper document processing device 102 then generates a new paper document based upon the original paper document and an identification tag is physically associated with the generated new paper document (step 206). As described above, various techniques may be used to physically associate an identification tag with the new generated paper document. According to an embodiment of the present invention, the identification tag may be automatically physically associated with the paper document, for example, by using tagged paper to generate the new paper document, applying an object such as a staple with the identification tag embedded in it to the new generated paper document, using ink containing the identification tag to print the paper document, etc. In alternative embodiments, paper document processing device 102 may dispense an identification tag (e.g., a label comprising an identification tag) and request a user to physically associate the dispensed identification tag with the new paper document generated by paper document processing device 102.

Paper document processing device 102 then reads the identification code stored by the identification tag that is physically associated with the new paper document generated in step 206 (step 208). Tag readers 144 of tag subsystem 134 may be used to read the identification code information from the identification tag. As previously described, various different techniques may be used to read identification code information stored by the identification tag. The type of technique used for reading information stored by the identification tag generally depends on the type of identification tag used by the paper document output device. The identification code read in step 208 is used to uniquely identify the paper document generated in step 206.

The identification code read in step 208 and the electronic representation of the original paper document obtained in step 204 is then communicated to data processing system 104 for further processing (step 210). Other information related to the new paper document may also be communicated to data processing system 104. For example, information identifying the physical location of the new paper document may be communicated to data processing system 104.

Paper document processing device 102 then receives electronic document information (or a portion thereof) from data processing system 104 (step 212). According to an embodiment of the present invention, the electronic document information is determined by data processing system 104 based upon the electronic representation communicated to data processing system 104 in step 210.

Paper document processing device 102 then stores the electronic document information (or a portion thereof) received in step 212 on the identification tag that is physically associated with the new paper document generated in step 206 (step 214). Various techniques known to those skilled in the art may be used for storing the information in the memory of the identification tag. Steps 212 and 214 may not be performed in certain embodiments of the present invention.

Figure 3:
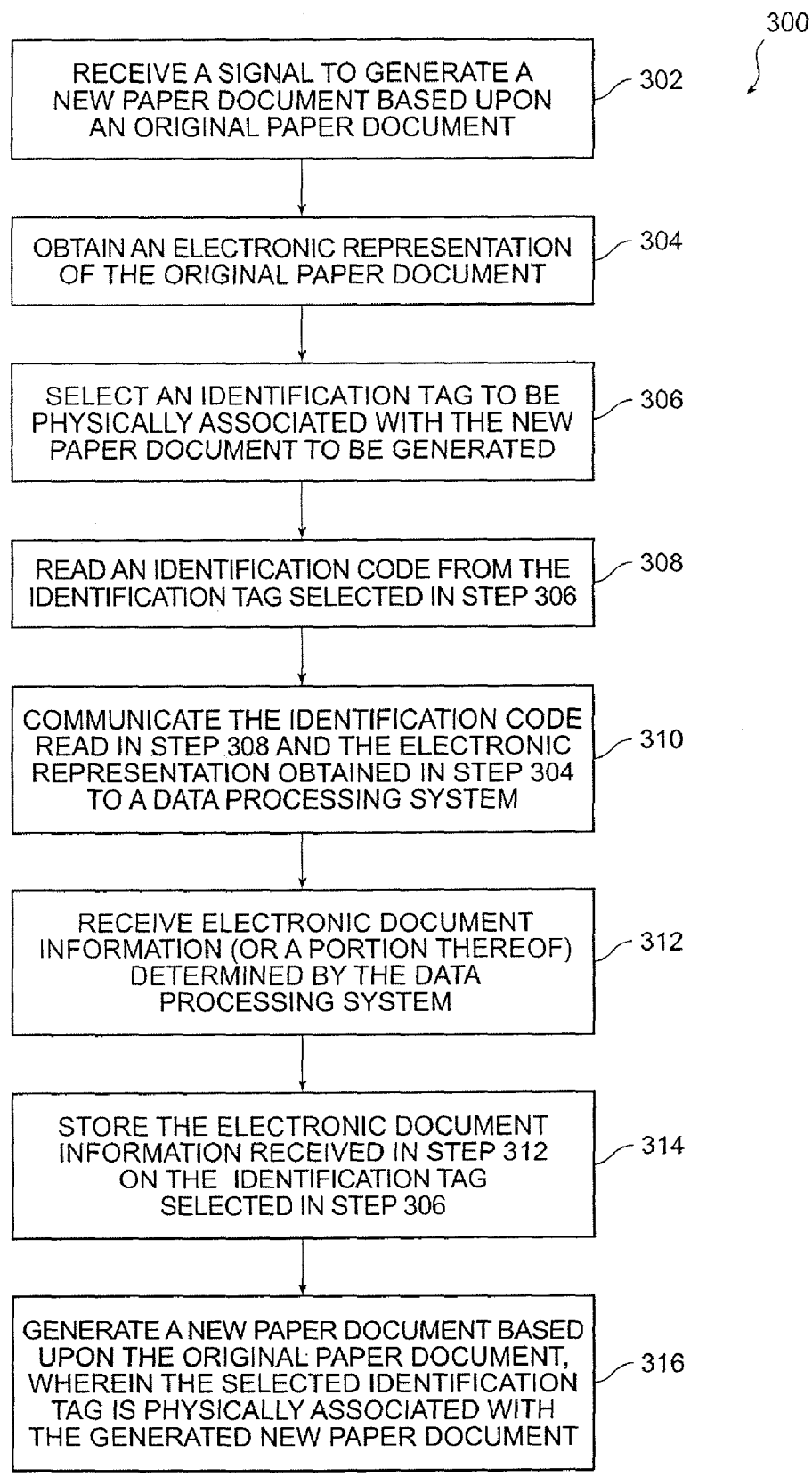
FIG. 3 is a simplified high-level flowchart depicting a method performed by a paper document processing device for generating a paper document according to another embodiment of the present invention.

FIG. 3 is a simplified high-level flowchart 300 depicting a method performed by paper document processing device 102 for generating a paper document (either document 112', 114, or 118) according to another embodiment of the present invention. The flowchart depicted in FIG. 3 assumes that a paper document processing device 102 is coupled to a data processing system 104 (similar to the embodiment shown in FIG. 1A). However, it should be understood that the general processing depicted in FIG. 3 may also be applied to other embodiments of the present invention. Further, flowchart 300 depicted in FIG. 3 assumes that a new paper document 114 is to be generated based upon original paper document 112. It should however be understood that the processing depicted in FIG. 3 may also be applied to generate documents 112' or 118. Accordingly, flowchart 300 depicted in FIG. 3 is merely illustrative of an embodiment incorporating the present invention and does not limit the scope of the invention as recited in the claims. One of ordinary skill in the art would recognize variations, modifications, and alternatives. The processing depicted in FIG. 3 may be performed by software modules executed by a processor of paper document processing device 102, by hardware modules of paper document processing device 102, or a combination thereof.

As depicted in FIG. 3, processing is initiated when paper document processing device 102 receives a signal to generate a new paper document based upon an original document 112 provided to paper document processing device 102 (step 302). The signal may be received from various sources. For example, if paper document processing device 102 is configured to function as a copier, the signal may be received when a user selects a "Copy/Start" key provided by the user interface of paper document processing device 102. The signal may also be received from various applications and devices.

Paper document processing device 102 then obtains an electronic representation of the original paper document (step 304). According to an embodiment of the present invention, paper document processing device 102 captures a scanned image of the original paper document. As described above, scanner subsystem 130 of paper document processing device 102 may be configured to capture and generate a scanned image of the original paper document.

An identification tag that is to be physically associated with the new paper document is then selected (step 306). The identification tag may be selected from a plurality of identification tags available to paper document processing device 102. Alternatively, the selected identification tag may represent an identification tag embedded in a tagged paper to be used for generating the new paper document. The selected identification tag may also represent an identification tag that is attached to an object (e.g., a staple, a clip) that is to be physically associated with the new paper document.

Paper document processing device 102 then reads the identification code stored by the identification tag selected in step 306 (step 308). Tag readers 144 of tag subsystem 134 may be used to read the identification code information from the selected identification tag. As previously described, various different techniques may be used to read identification code information stored by the identification tag. The type of technique used for reading information stored by the selected identification tag generally depends on the type of identification tag used by the paper document output device. The identification code read in step 308 is used to uniquely identify the new paper document to be generated.

The identification code read in step 308 and the electronic representation of the original paper document obtained in step 304 is then communicated to data processing system 104 for further processing (step 310). Other information related to the new paper document may also be communicated to data processing system 104. For example, information identifying the physical location of the new paper document may be communicated to data processing system 104.

Paper document processing device 102 then receives electronic document information (or a portion thereof) from data processing system 104 (step 312). According to an embodiment of the present invention, the electronic document information is determined by data processing system 104 based upon the electronic representation communicated to data processing system 104 in step 310.

Paper document processing device 102 then stores the electronic document information (or a portion thereof) received in step 312 on the identification tag selected in step 306 (step 314). Various techniques known to those skilled in the art may be used for storing the information in the memory of the identification tag. Steps 312 and 314 may not be performed in certain embodiments of the present invention.

Paper document processing device 102 then generates a new paper document based upon the original paper document and the selected identification tag is physically associated with the generated new paper document (step 316). As described above, various techniques may be used to physically associate an identification tag with the new generated paper document. According to an embodiment of the present invention, the identification tag may be automatically physically associated with the paper document, for example, by using tagged paper to generate the new paper document, applying an object such as a staple with the identification tag embedded in it to the new generated paper document, using ink containing the identification tag to print the paper document, etc. In alternative embodiments, paper document processing device 102 may dispense an identification tag (e.g., a label comprising an identification tag) and request a user to physically associate the dispensed identification tag with the new paper document generated by paper document processing device 102.

Figure 4:
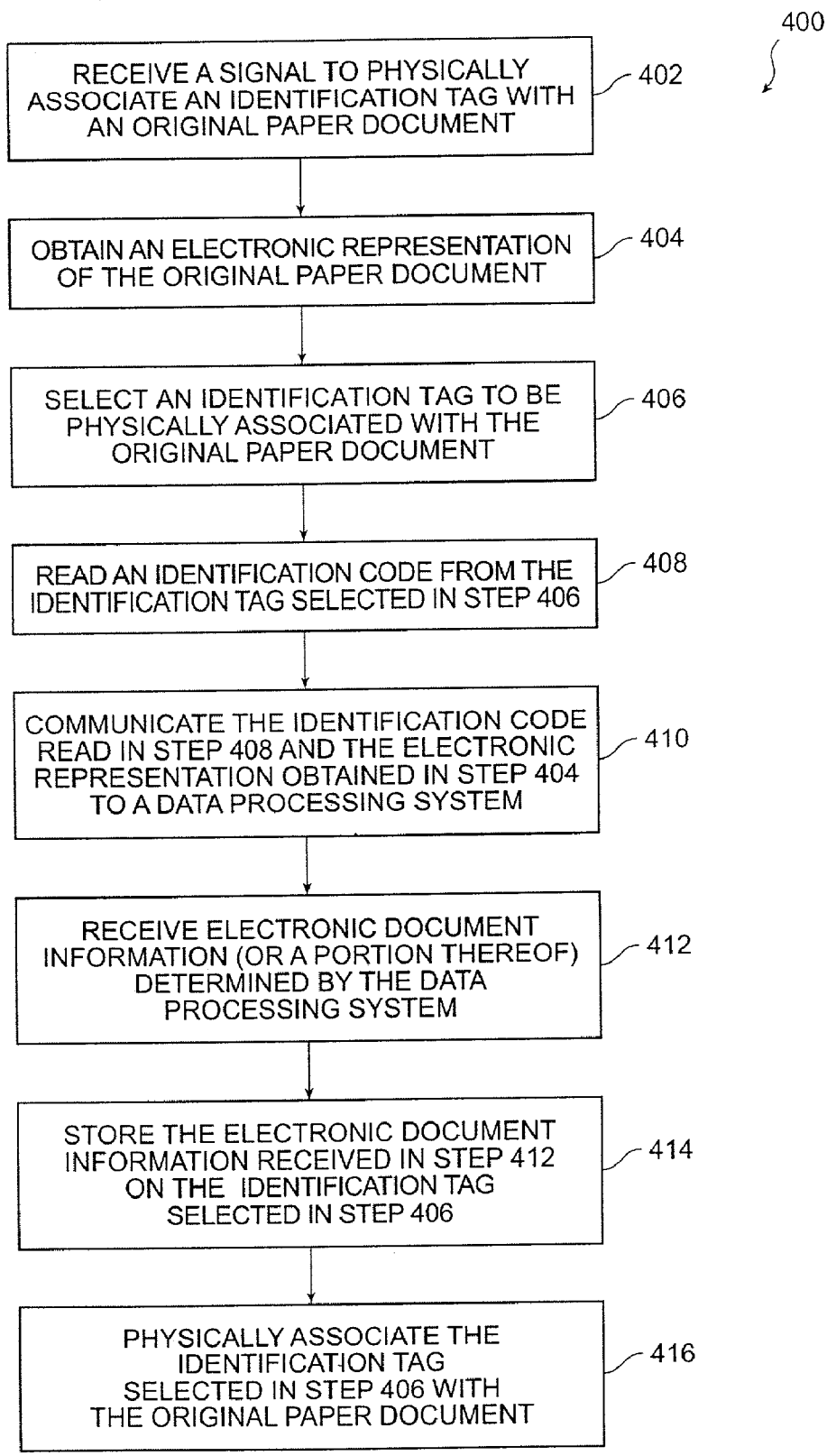
FIG. 4 is a simplified high-level flowchart depicting a method performed by a paper document processing device for physically associating an identification tag with original document 112 to produce document 112' according to another embodiment of the present invention.

Although flowcharts 200 and 300 depict methods for generating a new paper document 114, the flowcharts steps may also be used to physically associate an identification tag with original paper document 112 to produce document 112'. FIG. 4 is a simplified high-level flowchart 400 depicting a method performed by paper document processing device 102 for physically associating an identification tag with original document 112 to produce document 112' according to another embodiment of the present invention. Flowchart 400 depicted in FIG. 4 assumes that a paper document processing device 102 is coupled to a data processing system 104 (similar to the embodiment shown in FIG. 1A). However, it should be understood that the general processing depicted in FIG. 4 may also be applied to other embodiments of the present invention.

Accordingly, flowchart 400 depicted in FIG. 4 is merely illustrative of an embodiment incorporating the present invention and does not limit the scope of the invention as recited in the claims. One of ordinary skill in the art would recognize variations, modifications, and alternatives. The processing depicted in FIG. 4 may be performed by software modules executed by a processor of paper document processing device 102, by hardware modules of paper document processing device 102, or a combination thereof.

As depicted in FIG. 4, processing is initiated when paper document processing device 102 receives a signal to physically associate an identification tag with an original document 112 (step 402). The signal may be received from various sources. For example, the signal may be received via a user interface of paper document processing device 102. The signal may also be received from various applications and devices.

Paper document processing device 102 then obtains an electronic representation of the original paper document (step 404). According to an embodiment of the present invention, paper document processing device 102 captures a scanned image of the original paper document in step 404. As described above, scanner subsystem 130 of paper document processing device 102 may be configured to capture and generate a scanned image of the original paper document.

An identification tag that is to be physically associated with the original paper document is then selected (step 406). The identification tag may be selected from a plurality of identification tags available to paper document processing device 102. Alternatively, the selected identification tag may represent an identification tag attached to an object (e.g., a staple, a clip) that is to be physically associated with the original paper document, etc.

Paper document processing device 102 then reads the identification code stored by the identification tag selected in step 406 (step 408). Tag readers 144 of tag subsystem 134 may be used to read the identification code information from the identification tag. As previously described, various different techniques may be used to read identification code information stored by the identification tag. The type of technique used for reading information stored by the identification tag generally depends on the type of identification tag used by the paper document output device. The identification code read in step 408 is used to identify the new paper document to be generated.

The identification code read in step 408 and the electronic representation of the original paper document obtained in step 404 is then communicated to data processing system 104 for further processing (step 410). Other information related to the original paper document may also be communicated to data processing system 104. For example, information identifying the physical location of the original paper document may be communicated to data processing system 104.

Paper document processing device 102 then receives electronic document information (or a portion thereof) from data processing system 104 (step 412). The electronic document information is determined by data processing system 104 based upon the electronic representation communicated to data processing system 104 in step 410.

Paper document processing device 102 then stores the electronic document information (or a portion thereof) received in step 412 on the identification tag selected in step 406 (step 414). Various techniques known to those skilled in the art may be used for storing the information in the memory of the identification tag. Steps 412 and 414 may not be performed in certain embodiments of the present invention.

Paper document processing device 102 then physically associates the identification tag selected in step 406 with the original paper document (step 416). As described above, various techniques may be used to physically associate an identification tag with the original paper document. According to an embodiment of the present invention, the identification tag may be automatically physically associated with the paper document, for example, by applying an object such as a staple with the identification tag embedded in it to the original paper document. In alternative embodiments, paper document processing device 102 may dispense an identification tag (e.g., a label comprising an identification tag) and request a user to physically associate the dispensed identification tag with the original paper document.

Figure 5:
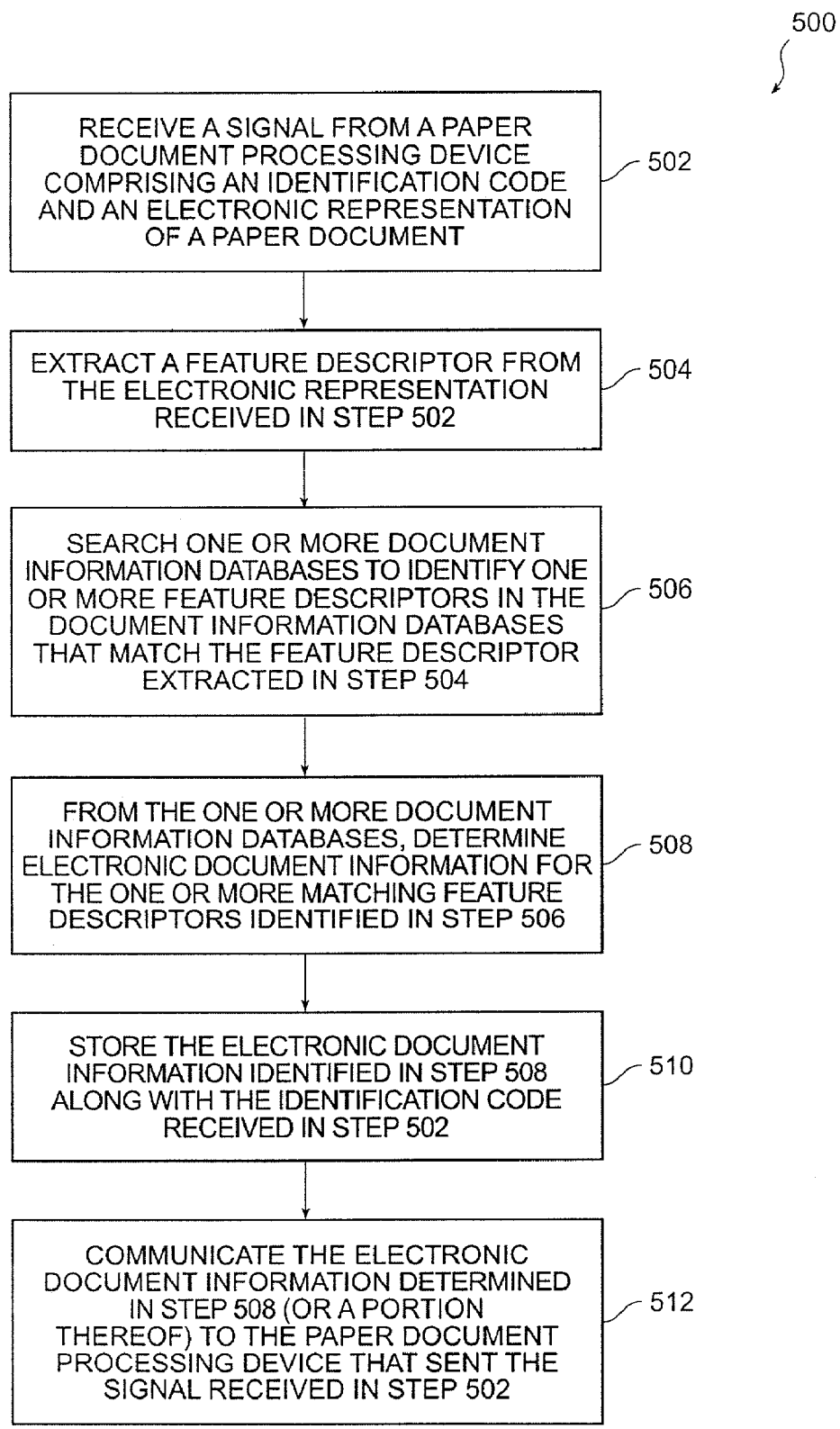
FIG. 5 is a simplified high-level flowchart depicting a method performed by a data processing system for determining electronic document information according to an embodiment of the present invention.

As described above, according to an embodiment of the present invention, data processing system 104 determines electronic document information for a paper document based upon information received from paper document processing device 102. FIG. 5 is a simplified high-level flowchart 500 depicting a method performed by data processing system 104 for determining electronic document information according to an embodiment of the present invention. The flowchart depicted in FIG. 5 assumes that a paper document processing device 102 is coupled to a data processing system 104 (similar to the embodiment shown in FIG. 1A). However, it should be understood that the general processing depicted in FIG. 5 may also be applied to other embodiments of the present invention. For example, for the embodiment of the present invention depicted in FIG. 1B, the processing depicted in FIG. 5 is performed by paper document processing device 102. Accordingly, flowchart 500 depicted in FIG. 5 is merely illustrative of an embodiment incorporating the present invention and does not limit the scope of the invention as recited in the claims. One of ordinary skill in the art would recognize variations, modifications, and alternatives. The processing depicted in FIG. 5 may be performed by software modules executed by a processor of data processing system 104, by hardware modules of data processing system 104, or a combination thereof.

As depicted in FIG. 5, processing is initiated when data processing system 104 receives a signal from a paper document processing device 102 (step 502). The signal may comprise information identifying an identification code corresponding to an identification tag and electronic representation of a paper document. Other types of information such as the physical location of a paper document may also be included in alternative embodiments of the present invention.

Data processing system 104 then extracts a feature descriptor from the electronic representation received in step 502 (step 504). A feature descriptor extracted from an electronic representation of a paper document represents information extracted from the electronic representation (e.g., a scanned image). The feature descriptor can be used to uniquely identify the document. The extracted feature descriptor can be matched to other feature descriptors if the feature descriptors are consistently extracted from a similarly located section of the electronic representation. For example, a small rectangular patch from the upper left hand corner of the first page of a document may be selected for extracting a feature descriptor. One technique used by data processing system 104 for extracting a feature descriptor from an electronic representation is described below. Various other feature extraction techniques known to those skilled in the art may also be used by data processing system 104. For example, the various feature extraction techniques described in U.S. Pat. No. 6,104,834 may also be used by the present invention. The entire contents of U.S. Pat. No. 6,104,834 are incorporated herein by reference for all purposes.

Data processing system 104 then searches the one or more document information databases 110 to identify one or more feature descriptors that match the feature descriptor extracted in step 504 (step 506). If the feature descriptor extracted in step 504 and the feature descriptors stored in document information databases 110 are extracted from a consistent location of an electronic representation (e.g., a scanned image) of a paper document, then if two feature descriptors match, it implies that there is a high likelihood that the scanned images from which the feature descriptors were extracted also match. Alternatively, if two feature descriptors do not match, then there is a high likelihood that the scanned images used for extracting the feature descriptors are different, and as a result the documents are different. Accordingly, in step 506 data processing system 104 identifies one or more feature descriptors in document information databases 110 that match the feature descriptor extracted in step 504.

As described above, according to an embodiment of the present invention, each document information database 110 stores feature descriptors that have been previously determined for a plurality of documents. For each feature descriptor, electronic document information corresponding to the feature descriptor is also stored. The electronic document information may comprise information identifying an electronic document, information specifying a storage location for the electronic document represented by the feature descriptor or a pointer or reference to the electronic document. For example, electronic document information for a particular feature descriptor may identify a file corresponding to the particular feature descriptor and a directory location where the file is stored, a uniform resource identifier or locator (URI or URL) pointing to an electronic document represented by the particular feature descriptor, and other like information. The information in a document information database 110 may be indexed by the feature descriptors information. Accordingly, for the feature descriptor extracted in step 504, data processing system 104 may use the feature descriptor to search document information databases 110 to find one or more matching feature descriptors. Since a set of matching feature descriptors implies that there is a high likelihood that the scanned images corresponding to the feature descriptors match, it further implies that the electronic document from which a matching feature descriptor was extracted corresponds to the paper document from whose electronic representation the other feature descriptor was extracted.

Data processing system 104 then determines, from document information databases 110, electronic document information corresponding to each matching feature descriptor determined in step 506 (step 508). Data processing system 104 may then store the electronic document information determined in step 508 along with the identification code received in step 502 in paper document tracking database 108 (step 510). The electronic document information is associated with the identification code and stored in a manner such that the electronic document information for a particular identification code can be determined given the identification code.

Other information received by data processing system 104 from paper document processing device 102 in step 502 for the particular identification code may also be stored such that the other information can be retrieved given the identification code information. For example, as described in U.S. patent application Ser. No. 10/235,035, information identifying physical location of a paper document corresponding to the identification code may also be stored in paper document tracking database 108. The information stored in paper document tracking database 108 may be indexed by the identification code information. As depicted in FIG. 1A, paper document tracking database 108 may be implemented as a table wherein each row of the table stores information related to a particular identification code. As shown in FIG. 1A, each row stores information identifying an identification code, electronic document information determined by data processing system 104 for a paper document corresponding to the identification code, physical location information for the paper document identified by the identification code, and other information related to the paper document corresponding to the identification code.

The electronic document information determined in step 508, or a portion thereof, may then be communicated to the paper document processing device 102 that was the source of the signal received in step 502 (step 512). As described above, paper document processing device 102 may then store the information in an identification tag.

Figure 6:
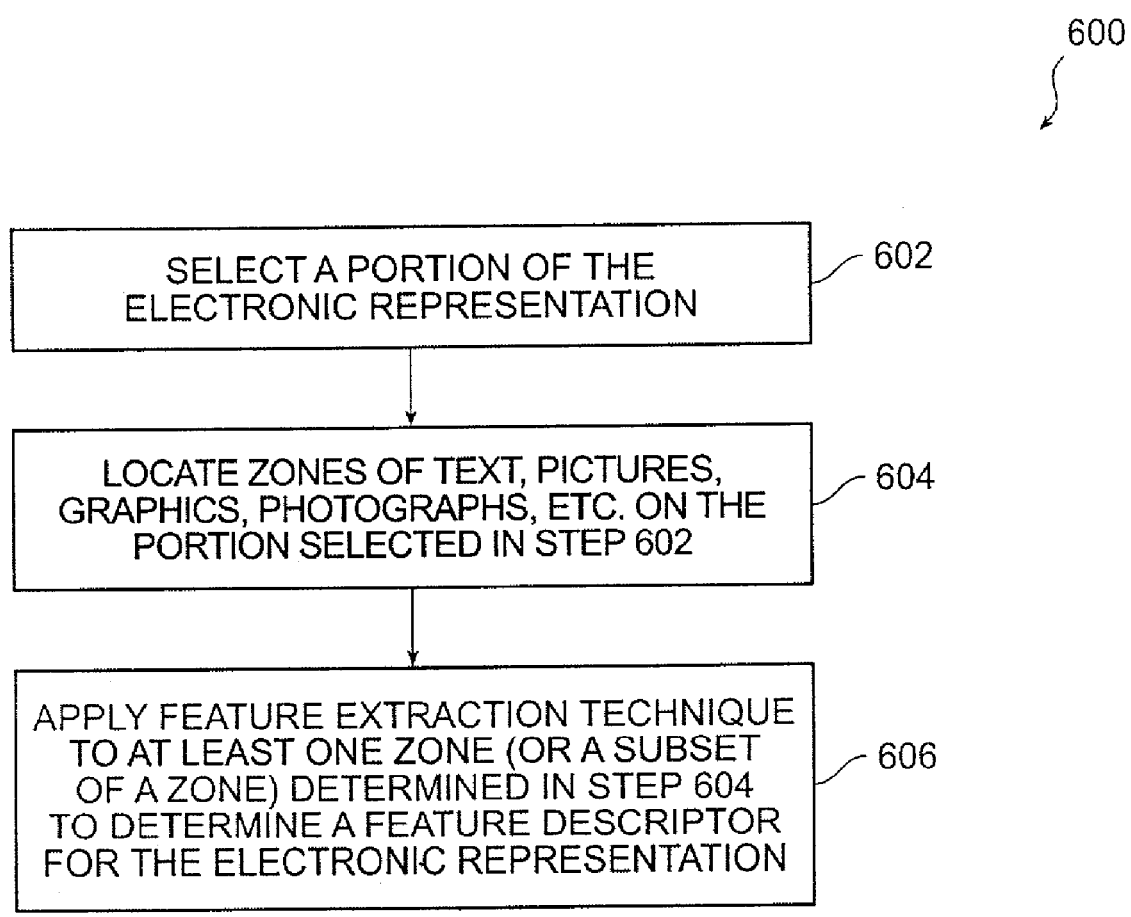
FIG. 6 is a simplified high-level flowchart depicting a method of extracting a feature descriptor from an electronic representation of a paper document according to an embodiment of the present invention.

FIG. 6 is a simplified high-level flowchart 600 depicting a method of extracting a feature descriptor from an electronic representation of a paper document according to an embodiment of the present invention. The processing depicted in FIG. 6 may be performed by data processing system 104 (for embodiment depicted in FIG. 1A) or by paper document processing device 102 (for the embodiment depicted in FIG. 1B). Flowchart 600 depicted in FIG. 6 is merely illustrative of an embodiment incorporating the present invention and does not limit the scope of the invention as recited in the claims. One of ordinary skill in the art would recognize variations, modifications, and alternatives. The processing depicted in FIG. 6 may be performed by software modules executed by a processor, by hardware modules, or a combination thereof. According to an embodiment of the present invention, the processing depicted in FIG. 6 is performed in step 504 of flowchart 500 depicted in FIG. 5.

As depicted in FIG. 6, a portion of the electronic representation is selected (step 602). The selected portion may represent, for example, a section of the electronic representation corresponding to a particular page of a document.

Zones of text, pictures, graphics, photographs, etc. are then located on the portion selected in step 602 (step 604). The coordinates (e.g., X-coordinates and Y-coordinates) and extent of each zone may be calculated in step 604.

A feature extraction technique is then applied to at least one zone (or a subset of a zone) determined in step 604 to determine a feature descriptor for the electronic representation (step 606). To enable matching of the feature descriptor extracted for the electronic representation and feature descriptors stored in document information databases 110, the location of the one or more zones used for feature extraction are the same as those selected for extracting feature descriptors stored in document information databases 110.

Several different feature extraction techniques known to those skilled in the art may be applied. According to one technique, optical character recognition (OCR) may be applied to one or more zones and the results of the OCR analysis represent the feature descriptor for the electronic representation of the paper document. Various other techniques known to those skilled in the art may be used in alternative embodiments of the present invention.

The feature descriptor extracted in step 606 may then be used to search one or more document information databases 110 as indicated in step 506 of flowchart 500 in FIG. 5. According to an embodiment of the present invention, a search query may be constructed using the extracted feature descriptor. The search query may then be used to search the document information databases 110 to locate matching feature descriptors per step 506 of flowchart 500 depicted in FIG. 5.

Figure 7:
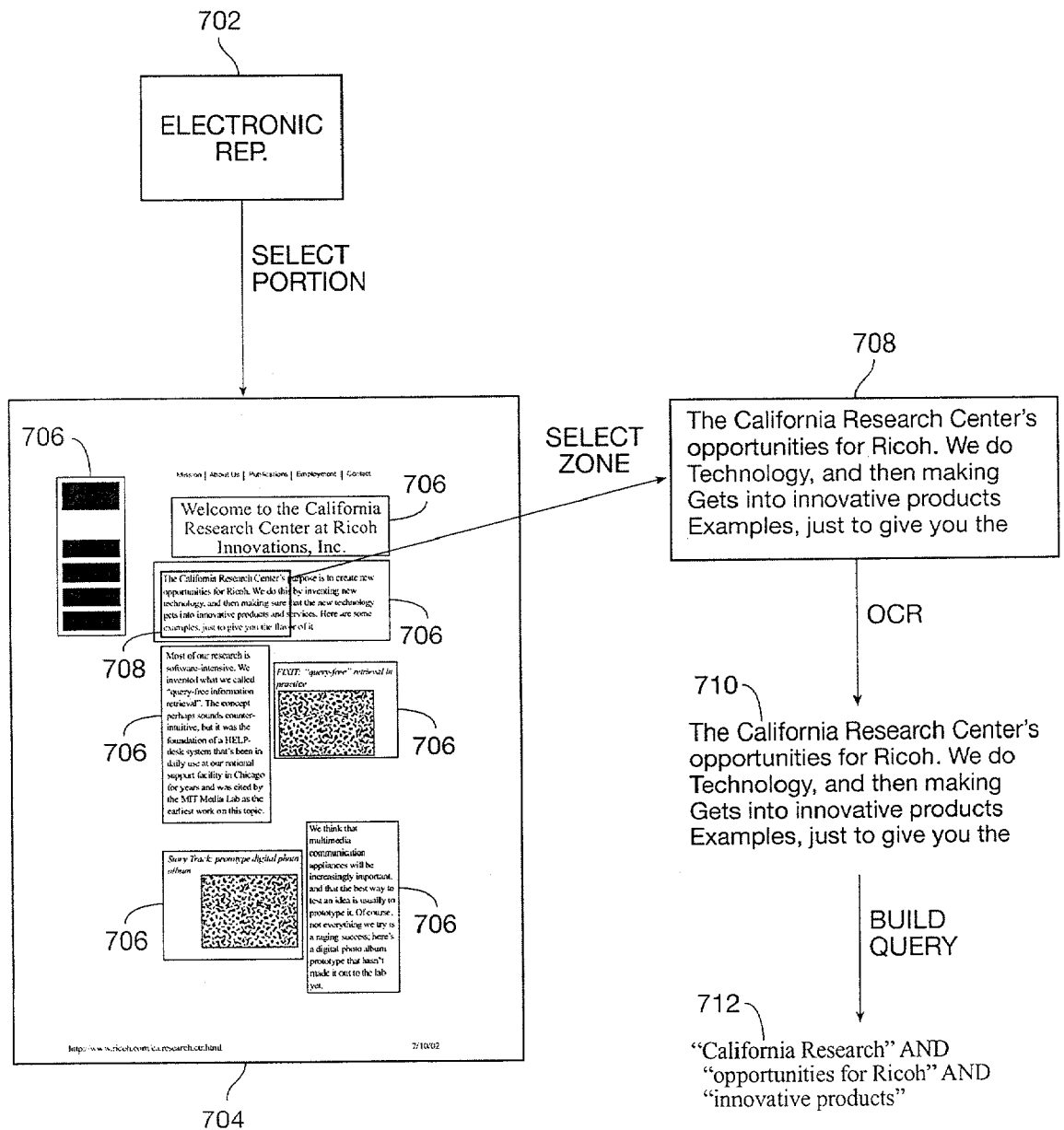
FIG. 7 depicts an example of applying the method depicted in FIG. 6 according to an embodiment of the present invention.

FIG. 7 depicts an example of applying the method depicted in FIG. 6 according to an embodiment of the present invention. As shown in FIG. 7, a portion 704 of electronic representation (e.g., scanned image) 702 representing a first page of a document is selected. Various zones 706 are then identified on the selected portion. A subset 708 of a text zone is then selected for extracting the feature descriptor. OCR feature extraction techniques are then applied to subset zone 708 and the result of the OCR analysis represents the feature descriptor 710 for electronic representation 702. A search query 712 is then configured based upon the feature descriptor. Search query 712 may then be used to search document information databases 110.

As described above, according to an embodiment of the present invention, electronic document information for a paper document is located and stored along with the identification code read from an identification tag that is physically associated with the paper document. For example, the information may be stored in a paper document tracking database 108. According to an embodiment of the present invention, the electronic document information may also be stored in the identification tag that is physically associated with the paper document. The information stored in paper document tracking database 108 and/or the information stored in the identification tag may be used in various applications for various purposes.

According to one application, the stored information for a paper document may be used to generate a "perfect" copy of the paper document. A well known inherent problem with photocopying a document is that the quality of the photocopy degrades as successive copies are made. For example, if the original paper document is referred to as the "0th generation," all copies are first generation, at best. Degradation of copy quality is inevitable as copies are made from successive (i.e., first, second, third, etc.) generation copies wherein the cumulative degradation can ultimately result in an unrecognizable document. The present invention resolves this problem and can be used to generate photocopies that are as good as the original paper document, i.e. a "perfect" photocopy.

Various techniques may be used to generate a "perfect" photocopy of a paper document that has an identification tag physically associated with it. As described above, according to an embodiment of the present invention, the identification tag stores electronic document information for the paper document which specifies an electronic document corresponding to the paper document and the storage location of the electronic document. When a photocopy of the paper document is to be generated, the copier may be configured to read the electronic document information for the paper document from the identification tag that is physically associated with the paper document, access the electronic document corresponding to the paper document, and use the electronic document to generate the photocopy. In this manner, the copier is able to generate a "0th generation" photocopy on a continuous basis.

If the electronic document information is not stored in the identification tag that is physically associated with the paper document, the copier may be configured to read the identification code from the identification tag, use the identification code to locate a record (e.g., a row in a table) in paper document tracking database 108, find electronic document information for the paper document corresponding to the identification code from the paper document tracking database, and then use the electronic document information to generate the photocopy. In this manner, the copier is able to generate a "0th generation" photocopy for the paper document.

Various other operations, besides photocopying, may also be performed on an electronic document corresponding to a paper document using the paper document. For example, a facsimile machine may be configured to read information stored in an identification tag that is physically associated with a paper document, use the information to locate an electronic document corresponding to the paper document, and use the electronic document to communicate information via facsimile. A printer may be configured to read information stored in an identification tag that is physically associated with a paper document, use the information to locate an electronic document corresponding to the paper document, and generate a printout based upon the electronic document. Various other operations that can be performed on electronic documents are also envisioned within the scope of the present invention.

According to an embodiment of the present invention, the physical location of a paper document that has an identification tag physically associated with it can be tracked. Please refer to U.S. patent application Ser. No. 10/235,035 for further details.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of processing a paper document, the method comprising:
   receiving an identification code associated with an identification tag;
   determining, from a first database storing information associated with a plurality of feature descriptors, electronic information to be associated with the identification code, the determining comprising:
      obtaining an electronic representation of contents printed on a first paper document;
      selecting a portion of the obtained electronic representation;
      locating one or more zones on the selected portion;
      determining a first feature descriptor based upon at least one zone of the one or more zones on the selected portion, the first feature descriptor being distinct from the identification code;
      determining a matching feature descriptor from the first database that matches the first feature descriptor; and
      determining, from the first database, electronic document information associated with the matching feature descriptor; and
   storing the identification code and the electronic document information associated with the matching feature descriptor in memory, whereby the electronic document information associated with the matching feature descriptor is associated with the identification code and is determinable using the identification code.

2. The method of claim 1 wherein the electronic document information associated with the matching feature descriptor comprises information identifying a storage location of an electronic document corresponding to the first paper document.

3. The method of claim 1 wherein the electronic document information associated with the matching feature descriptor comprises a uniform resource identifier (URI).

4. The method of claim 1 further comprising:
   generating a second paper document, wherein the second paper document is a copy of the first paper document and the identification tag is attached to the second paper document, embedded in the second paper document, or attached to an object that is attached to the second paper document.

5. The method of claim 1 further comprising physically associating the identification tag with the first paper document by attaching the identification tag to the first paper document, embedding the identification tag in the first paper document, or attaching an object to the first paper document wherein the identification tag is attached to the object.

6. The method of claim 5 further comprising:
   reading the identification code from the identification tag physically associated with the first paper document;
   determining a matching identification code from the memory that matches the identification code;
   determining, from the memory, electronic document information associated with the matching identification code; and
   performing an operation using the electronic document information associated with the matching identification code.

7. The method of claim 6 wherein the electronic document information associated with the matching identification code identifies an electronic document and wherein performing the operation comprises generating a second paper document using the electronic document identified by the electronic document information associated with the matching identification code.

8. The method of claim 1 wherein the identification tag is physically associated with the first paper document by being attached to first paper document, by being embedded in the first paper document, or being attached to an object that is attached to the first paper document.

9. The method of claim 1 further comprising:
   storing the electronic document information associated with the matching feature descriptor on the identification tag; and
   generating a second paper document, wherein the identification tag is physically associated with the second paper document by being attached to second paper document, by being embedded in the second paper document, or being attached to an object that is attached to the second paper document.

10. The method of claim 9 wherein:
    the identification tag is a radio frequency identification device; and storing the electronic document information associated with the matching feature descriptor on the identification tag comprises storing the electronic document information associated with the matching feature descriptor in a memory of the radio frequency identification device.

11. The method of claim 10 further comprising:
reading the information from the radio frequency identification device; and
generating a third paper document using the information read from the radio frequency identification device, wherein the third paper document is a copy of the second paper document.

12. The method of claim 1 wherein obtaining the electronic representation comprises obtaining a scanned image of the first paper document.

13. The method of claim 1 wherein determining the first feature descriptor comprises:
extracting textual, graphical, or pictorial information from the one or more zones on the selected portion; and
performing a recognition technique on the extracted textual, graphical, or pictorial information.

14. The method of claim 1 wherein determining the first feature descriptor based upon the at least one zone of the one or more zones comprises applying an optical character recognition technique to textual information in the at least one zone.

15. The method of claim 1, wherein the location of the one or more zones is the same as selected for extracting feature descriptors stored in the first database.

16. The method of claim 1, wherein determining a matching feature descriptor comprises:
forming one or more search queries from the first feature descriptor; and
searching the first database for a matching feature descriptor using the one or more search queries.

17. The method of claim 1 wherein locating the one or more zones on the selected portion comprises calculating one or more X-coordinates and associated Y-coordinates for the one or more zones.

18. A system for processing a paper document, the system comprising:
a processor; and
a memory coupled to the processor, the memory configured to store a plurality of code modules for execution by the processor, the plurality of code modules comprising:
a code module for receiving an identification code associated with an identification tag;
a code module for determining, from a first database storing information associated with a plurality of feature descriptors, electronic information to be associated with the identification code, the code module for determining comprising:
a code module for obtaining an electronic representation of contents printed on a first paper document;
a code module for selecting a portion of the obtained electronic representation;
a code module for locating one or more zones on the selected portion;
a code module for determining a first feature descriptor based upon at least one zone of the one or more zones on the selected portion, the first feature descriptor being distinct from the identification code;
a code module for determining a matching feature descriptor from the first database that matches the first feature descriptor; and
a code module for determining, from the first database, electronic document information associated with the matching feature descriptor; and
a code module for storing the identification code and the electronic document information associated with the matching feature descriptor in the memory, whereby the electronic document information associated with the matching feature descriptor is associated with the identification code and is determinable using the identification code.

19. The system of claim 18 wherein the electronic document information associated with the matching feature descriptor comprises information identifying a storage location of an electronic document corresponding to the first paper document.

20. The system of claim 18 wherein the electronic document information associated with the matching feature descriptor comprises a uniform resource identifier (URI).

21. The system of claim 18 further comprising:
a subsystem configured to generate a second paper document, wherein the second paper document is a copy of the first paper document and the identification tag is attached to the second paper document, embedded in the second paper document, or attached to an object that is attached to the second paper document.

22. The system of claim 18 further comprising a subsystem configured to physically associate the identification tag with the first paper document by attaching the identification tag to the first paper document, embedding the identification tag in the first paper document, or attaching an object to the first paper document wherein the identification tag is attached to the object.

23. The system of claim 22 further comprising:
a reader,
wherein the reader is configured to read the identification code from the identification tag physically associated with the first paper document;
wherein the processor is configured to determine a matching identification code from the memory that matches the identification code;
wherein the processor is configured to determine, from the memory, electronic document information associated with the matching identification code; and
wherein the processor is configured to cause performance of an operation using the electronic document information associated with the matching identification code.

24. The system of claim 23 wherein the electronic document information associated with the matching identification code identifies an electronic document and wherein the processor is configured to cause generation of a second paper document using the electronic document identified by the electronic document information associated with the matching identification code.

25. The system of claim 18 wherein the identification tag is physically associated with the first paper document by being attached to first paper document, by being embedded in the first paper document, or being attached to an object that is attached to the first paper document.

26. The system of claim 18:
wherein the plurality of code modules further comprises a code module for storing the electronic document information associated with the matching feature descriptor on the identification tag; and
the system further comprises a subsystem configured to generate a second paper document, wherein the identification tag is physically associated with the second paper document by being attached to second paper document, by being embedded in the second paper document, or being attached to an object that is attached to the second paper document.

27. The system of claim 26:
wherein the identification tag is a radio frequency identification device; and
wherein the plurality of code modules further comprises a code module for storing the electronic document information associated with the matching feature descriptor in a memory of the radio frequency identification device.

28. The system of claim 27 further comprising:
a reader configured to read the information from the radio frequency identification device; and
a printer configured to generate a third paper document using the information read from the radio frequency identification device, wherein the third paper document is a copy of the second paper document.

29. The system of claim 18 wherein the code module for obtaining the electronic representation comprises a code module for obtaining a scanned image of the first paper document.

30. The system of claim 18 wherein the code module for determining the first feature descriptor comprises:
a code module for extracting textual, graphical, or pictorial information from the one or more zones on the selected portion; and
a code module for performing a recognition technique on the extracted textual, graphical, or pictorial information.

31. The system of claim 18 wherein the code module for determining the first feature descriptor based upon the at least one zone of the one or more zones comprises a code module for applying an optical character recognition technique to textual information in the at least one zone.

32. A computer program product stored on a computer-readable storage medium for processing a paper document, the computer program product comprising:
code for receiving an identification code associated with an identification tag;
code for determining, from a first database storing information associated with a plurality of feature descriptors, electronic information to be associated with the identification code, the code for determining comprising:
code for obtaining an electronic representation of contents printed on a first paper document;
code for selecting a portion of the obtained electronic representation;
code for locating one or more zones on the selected portion;
code for determining a first feature descriptor based upon at least one zone of the one or more zones on the selected portion, the first feature descriptor being distinct from the identification code;
code for determining a matching feature descriptor from the first database that matches the first feature descriptor; and
code for determining, from the first database, electronic document information associated with the matching feature descriptor; and
code for storing the identification code and the electronic document information associated with the matching feature descriptor in memory, whereby the electronic document information associated with the matching feature descriptor is associated with the identification code and is determinable using the identification code.

33. The computer program product of claim 32 wherein the electronic document information associated with the matching feature descriptor comprises information identifying a storage location of an electronic document corresponding to the first paper document.

34. The computer program product of claim 32 wherein the electronic document information associated with the matching feature descriptor comprises a uniform resource identifier (URI).

35. The computer program product of claim 32 further comprising code for causing a second paper document to be generated, wherein the second paper document is a copy of the first document and the identification tag is attached to the second paper document, embedded in the second paper document, or attached to an object that is attached to the second paper document.

36. The computer program product of claim 32 further comprising code for causing the identification tag to be physically associated with the first paper document by being attached to first paper document, by being embedded in the first paper document, or being attached to an object that is attached to the first paper document.

37. The computer program product of claim 36 further comprising:
code for reading the identification code from the identification tag physically associated with the first paper document;
code for determining a matching identification code from the memory that matches the identification code;
code for determining, from the memory, electronic document information associated with the matching identification code; and
code for causing an operation to be performed using the electronic document information associated with the matching identification code.

38. The computer program product of claim 37 wherein the electronic document information associated with the matching identification code identifies an electronic document and wherein the code for causing the operation to be performed comprises code for causing a second paper document to be generated using the electronic document identified by the electronic document information associated with the matching identification code.

39. The computer program product of claim 32 wherein the code for storing the identification code comprises code for reading the identification code from the identification tag physically associated with the first paper document by being attached to first paper document, by being embedded in the first paper document, or being attached to an object that is attached to the first paper document.

40. The computer program product of claim 32 further comprising:
code for storing the electronic document information associated with the matching feature descriptor on the identification tag; and
code for causing generation of a second paper document, wherein the identification tag is physically associated with the second paper document by being attached to second paper document, by being embedded in the second paper document, or being attached to an object that is attached to the second paper document.

41. The computer program product of claim 40 wherein:
the identification tag is a radio frequency identification device; and
the code for storing the electronic document information associated with the matching feature descriptor on the identification tag comprises code for storing the electronic document information associated with the matching feature descriptor in a memory of the radio frequency identification device.

42. The computer program product of claim 41 further comprising:
    code for reading the information from the radio frequency identification device; and
    code for generating a third paper document using the information read from the radio frequency identification device, wherein the third paper document is a copy of the second paper document.

43. The computer program product of claim 32 wherein the code for obtaining the electronic representation comprises code for obtaining a scanned image of the first paper document.

44. The computer program product of claim 32 wherein the code for determining the first feature descriptor comprises:
    code for extracting textual, graphical, or pictorial information from the one or more zones on the selected portion; and
    code for performing a recognition technique on the extracted textual, graphical, or pictorial information.

45. The computer program product of claim 32 wherein the code for determining the first feature descriptor based upon the at least one zone of the one or more zones comprises code for applying an optical character recognition technique to textual information in the at least one zone.

46. A system for processing a paper document, the system comprising:
    means for receiving an identification code associated with an identification tag;
    means for determining, from a first database storing information associated with a plurality of feature descriptors, electronic information to be associated with the identification code, the means for determining comprising:
    means for obtaining an electronic representation of contents printed on a first paper document;
    means for selecting a portion of the obtained electronic representation;
    means for locating one or more zones on the selected portion;
    means for determining a first feature descriptor based upon at least one zone of the one or more zones on the selected portion, the first feature descriptor being distinct from the identification code;
    means for determining a matching feature descriptor from the first database that matches the first feature descriptor; and
    means for determining, from the first database, electronic document information associated with the matching feature descriptor; and
    means for storing the identification code and the electronic document information associated with the matching feature descriptor in a memory, whereby the electronic document information associated with the matching feature descriptor is associated with the identification code and is determinable using the identification code.

47. The system of claim 46 further comprising:
    means for reading the identification code from the identification tag, the identification tag being physically associated to the first paper document;
    means for determining a matching identification code from the memory that matches the identification code;
    means for determining, from the memory, electronic document information associated with the matching identification code; and
    means for performing the operation using the electronic document information associated with the matching identification code.

* * * * *

UNITED STATES PATENT AND TRADEMARK OFFICE
CERTIFICATE OF CORRECTION

| | | |
|---|---|---|
| PATENT NO. | : 7,506,250 B2 | Page 1 of 1 |
| APPLICATION NO. | : 10/235042 | |
| DATED | : March 17, 2009 | |
| INVENTOR(S) | : Jonathan J. Hull et al. | |

It is certified that error appears in the above-identified patent and that said Letters Patent is hereby corrected as shown below:

Title Page

Item (56) - References Cited

In the U.S. Patent Documents section,

Delete reference "2004/0017313 A1 1/2004 Manachs" and insert reference --2004/0017313 A1 1/2004 Menache--

Insert reference --6,227,032 5/2001 Shell et al.-- after reference 6,204,764 3/2001 Maloney and before reference 6,232,870 5/2001 Garber et al.

In the Foreign Patent Documents section,

Delete reference "JP 08-1019880 4/1996" and insert reference --JP 08-101980 4/1996--

Signed and Sealed this

Twenty-fourth Day of August, 2010

David J. Kappos
*Director of the United States Patent and Trademark Office*